April 17, 1928.  
F. H. BLINCOE  
STEM GRIPPING PRUNING SHEARS  
Filed Feb. 24, 1926
1,666,253
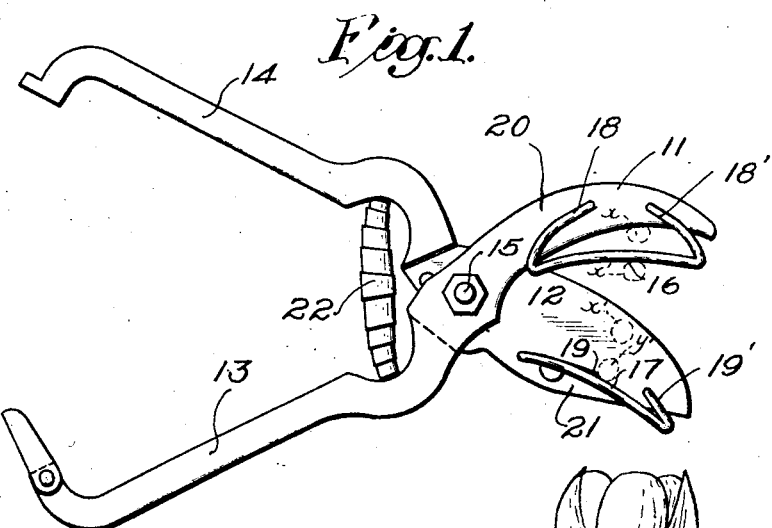
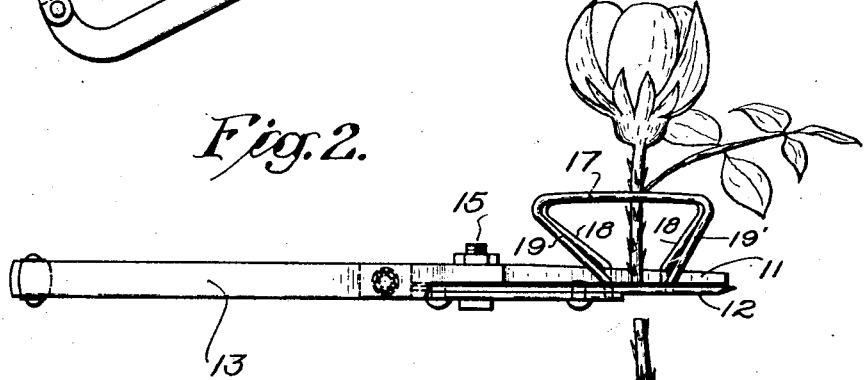
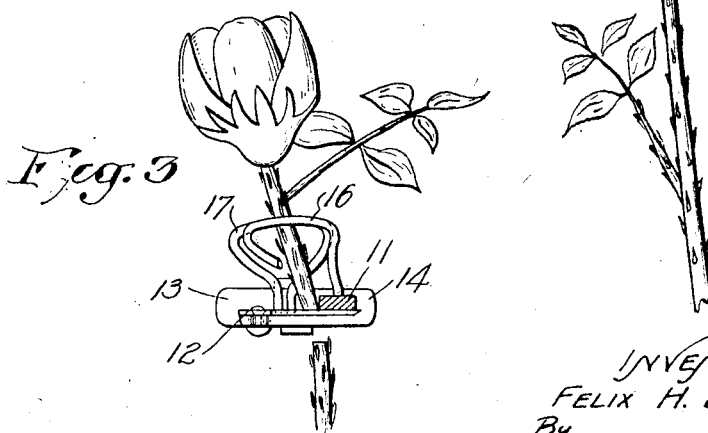
INVENTOR  
FELIX H. BLINCOE  
By  
ATTORNEY Patented Apr. 17, 1928.

1,666,253

UNITED STATES PATENT OFFICE.

FELIX H. BLINCOE, OF LONG BEACH, CALIFORNIA, ASSIGNOR OF ONE-FOURTH TO GLENN M. PETERSON, OF LOS ANGELES, CALIFORNIA.

STEM-GRIPPING PRUNING SHEARS.

Application filed February 24, 1926. Serial No. 90,238.

Although my present invention is referred to as a stem-gripping pruning shears, it may be understood to be an object of this invention to provide means whereby, when the stem of a flower, or the like, is cut, the same may be securely held in a fixed position until intentionally released; and although my improved novel shears may be used mainly in the gathering of roses or other flowers, as for purposes of sale or home decoration, it should be appreciated that the grippers hereinafter described can be used not only in obviating the use of one hand in engaging the stems of flowers, or the like, to be cut, to prevent the same from dropping, and also to hold the cut stem or branch firmly, in a fixed position in the shears until released, but also as an aid in the gathering of fruits, or in the pruning of vines or shrubs or trees, or the like, obviating much reaching and stooping to pick up cut-off parts.

The principles of my invention are, as a matter of fact, applicable to hand tools as unlike as, two-hand brush shears and tape-cutting shears; but, the purpose being in all cases an automatic and mechanical retention of cut-off parts, I describe the same only with reference to ordinary pruning shears,—such as may be advantageously used to minimize reaching and (or stooping and) or contact with thorny or other stems, to expedite the work of gathering cut flowers, or the like.

Other objects of my invention, including the provision of resilient and upstanding gripping members, adapted yieldably to engage stems, or the like, just before the same are cut off, and to grip and hold (without unduly compressing) the same at two points, one being at a suitable distance from the plane in which cutting is to occur, and the other at the point or end where cut—the mentioned gripping members or jaws being preferably formed of a suitably bent wire or equivalent material, shaped and secured in position in such a manner as to effect the desired results as hereinafter described,—may be best appreciated from the following description of an illustrative embodiment of my invention, taken in connection with the appended claims and the accompanying drawings, in which Fig. 1 may be referred to as a top plan view, showing my combined gripping and cutting device with its shearing jaws open.

Fig. 2 may then be referred to as a side elevational view, the jaws being shown as closed and as engaging a stem.

Fig. 3 may be referred to as an end view, with a part of one shearing jaw broken away, showing the gripping members as set at the proper angle from the plane of shearing,—so that, when the jaws are closed, the cut end of a stem will be slightly wedged and held in position not only at an upper level by said gripping members, but also by bracing, at a lower level, against an upwardly-extending surface of an abrupt edged jaw which is shown in this figure, as broken away.

Referring to the details of that specific embodiment of my invention chosen for purposes of illustration, 11 and 12 being the respective curved shearing jaws of a pair of pruning shears (these jaws being shown as rigidly or integrally connected with handles 13 and 14, and as pivoted together at 15, I show the jaw 11 as unprovided with a cutting edge and as carrying a gripping member 16, and the jaw 12 as provided with a cutting edge and as carrying a cooperating gripping member 17,—these gripping members being shown as also curved, but less divergent than the inner edges of said jaws and so spaced apart as to permit the engagement of a stem, or the like, before the described shears are completely closed.

In preferred embodiments of my invention, one or both of the gripping members 16 and 17 may be formed of a slightly yielding material, and/or may be resiliently connected with the respective jaws 11 and 12,—as by forming each of said members from a comparatively stiff wire suitably bent to form downwardly convergent and inclined spacing legs 18, 18' and 19, 19' respectively secured, as by inserting the same in holes, near the backs 20 and 21 of the respective jaws 11 and 12.

In order that the cut end of a stem may rest against and be firmly retained by an inclined engagement with an abrupt face shown at the inner edge of the jaw 11, the gripping member 16 is shown as offset relatively to this jaw and as adapted to overlie only the jaw 12, when said jaws are closed.

A device of the general character described may be used in the customary manner, except that, assuming the same to be provided with means such as a spring 22, tending to open the jaws 11, 12, the fingers of the user's hand may be kept closed, after a stem is cut, and the said shears then will grip said stem at two points and so hold it that it cannot flop over or slide around,— as would often be the case if it were not secured at two levels. This will enable the user to bring the object being so held within reach of his free hand, or to a basket or receptacle into which the stems, with any attached flowers, fruit, or the like may be dropped.

It will be seen that, in the illustrated form of my invention, although both gripping members may overlie the plate 12 at the completion of a cutting movement (a cut branch then contacting with the respective jaws somewhat as indicated by $x$ and $x'$, and with the respective gripping members somewhat as indicated by $y$ and $y'$, Fig. 1) neither of the gripping members at any time overlies the jaw 11; and, as a result of the relationships here referred to, a cut branch may be very firmly held in an upright but slightly inclined position, pending release by the relaxation of a user's grip upon the handles 13, 14.

Although I have herein described a single complete embodiment of my invention, it will be understood that various features thereof might be independently employed, and obvious also that numerous embodiments might be made by those skilled in the art to which this case relates, without the slightest departure from the spirit and scope of my invention, as the same is indicated above and in the following claims.

I claim as my invention:

1. In a device of the general character described: a pair of shearing jaws pivotally connected; and cooperating movable members, spaced therefrom, for the gripping of a part cut off by the closing of said jaws, one of said gripping members being resiliently supported, from one of said shearing jaws, by insertion therethrough near the rear edge thereof, one of said jaws being provided with a gripping edge and neither of said jaws being adapted at any time to overlie the last mentioned jaw, although both of said gripping members are adapted to so overlie the other of said jaws at the completion of a closing movement as to hold the cut branch in a slightly inclined position relatively to said jaws, with its end braced against said abrupt edge.

2. In a device of the general character described: a pair of shearing jaws pivotally connected; and cooperating movable members, spaced therefrom, for the gripping of a part cut off by the closing of said jaws, only one of said jaws being provided with a cutting edge and each of said gripping members being formed of resilient wire and rigidly connected with a corresponding jaw by insertion therethrough near one edge thereof.

3. In a device of the general character described: a pair of curved shearing jaws pivotally connected; and cooperating movable members, spaced therefrom, for the gripping of a part cut off by the closing of said jaws, said gripping members being also curved but less divergent, when open, than said jaws, and being respectively formed of resilient wire and rigidly connected by integral and convergent legs with corresponding jaws, by insertion of said legs directly through openings formed therein, one of said jaws being provided with an abrupt edge and both of said jaws being so related to said gripping members as to hold a cut branch braced against said abrupt edge and slightly inclined with reference to said jaws.

In testimony whereof, I have hereunto set my hand at Los Angeles, California, this 18th day of February, 1926.

FELIX H. BLINCOE.